United States Patent
Daniel

(10) Patent No.: US 9,089,775 B1
(45) Date of Patent: Jul. 28, 2015

(54) INTERACTIVE GAME SYSTEM AND METHODS FOR A TELEVISION AUDIENCE MEMBER TO MIMIC PHYSICAL MOVEMENTS OCCURRING IN TELEVISION BROADCAST CONTENT

(76) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 13/168,188

(22) Filed: Jun. 24, 2011

Related U.S. Application Data

(60) Provisional application No. 61/358,296, filed on Jun. 24, 2010.

(51) Int. Cl.
```
A63F 9/24        (2006.01)
A63F 13/00       (2014.01)
A63F 13/20       (2014.01)
A63F 13/213      (2014.01)
```

(52) U.S. Cl.
CPC .............. *A63F 13/20* (2014.09); *A63F 13/213* (2014.09)

(58) Field of Classification Search
CPC ......... A63F 13/00; A63F 13/06; A63F 13/10; A63F 13/1006; A63F 13/105; A63F 13/1062; A63F 13/1087; A63F 13/1093; G06T 2207/10016; G06T 2207/10021
USPC .............. 463/36–43; 381/103, 104, 105, 106; 382/103, 104, 105, 106
See application file for complete search history.

(56) References Cited

U.S. PATENT DOCUMENTS

| | | | | |
|---|---|---|---|---|
| 5,904,484 | A * | 5/1999 | Burns | 434/252 |
| 6,080,063 | A * | 6/2000 | Khosla | 463/42 |
| 6,430,997 | B1 * | 8/2002 | French et al. | 73/379.04 |
| 6,767,282 | B2 * | 7/2004 | Matsuyama et al. | 463/3 |
| 6,786,730 | B2 * | 9/2004 | Bleckley et al. | 434/247 |
| 8,009,022 | B2 * | 8/2011 | Kipman et al. | 340/407.1 |
| 8,083,589 | B1 * | 12/2011 | Kavars et al. | 463/36 |
| 8,142,267 | B2 * | 3/2012 | Adams | 463/2 |
| 8,210,947 | B2 * | 7/2012 | Nanba | 463/42 |
| 8,355,532 | B2 * | 1/2013 | Gillard et al. | 382/103 |
| 8,428,306 | B2 * | 4/2013 | Ikenoue | 382/103 |
| 2001/0003715 | A1 * | 6/2001 | Jutzi et al. | 463/40 |
| 2002/0041327 | A1 * | 4/2002 | Hildreth et al. | 348/42 |
| 2004/0224740 | A1 * | 11/2004 | Ball et al. | 463/6 |
| 2005/0130725 | A1 * | 6/2005 | Creamer et al. | 463/1 |
| 2005/0213817 | A1 * | 9/2005 | Miyamori | 382/181 |
| 2006/0252541 | A1 * | 11/2006 | Zalewski et al. | 463/36 |
| 2006/0287025 | A1 * | 12/2006 | French | 463/4 |
| 2007/0296723 | A1 * | 12/2007 | Williams | 345/473 |
| 2008/0005775 | A1 * | 1/2008 | Belton et al. | 725/139 |
| 2008/0261693 | A1 * | 10/2008 | Zalewski | 463/31 |
| 2009/0029754 | A1 * | 1/2009 | Slocum et al. | 463/5 |
| 2009/0061971 | A1 * | 3/2009 | Weitzner et al. | 463/2 |
| 2009/0143124 | A1 * | 6/2009 | Hughes et al. | 463/2 |
| 2009/0163262 | A1 * | 6/2009 | Kang | 463/8 |
| 2009/0189982 | A1 * | 7/2009 | Tawiah | 348/157 |
| 2009/0209343 | A1 * | 8/2009 | Foxlin et al. | 463/36 |
| 2009/0221374 | A1 * | 9/2009 | Yen et al. | 463/42 |
| 2009/0258685 | A1 * | 10/2009 | Gaidos et al. | 463/1 |
| 2010/0029352 | A1 * | 2/2010 | Angelopoulos | 463/4 |
| 2010/0197399 | A1 * | 8/2010 | Geiss | 463/32 |
| 2010/0246887 | A1 * | 9/2010 | Beresford et al. | 382/103 |
| 2010/0271367 | A1 * | 10/2010 | Vaden et al. | 345/420 |
| 2012/0142421 | A1 * | 6/2012 | Kennedy, Jr. | 463/39 |

\* cited by examiner

*Primary Examiner* — Milap Shah
(74) *Attorney, Agent, or Firm* — Alberto Interian, III, Esq.

(57) ABSTRACT

A system comprising at least one processor; and computer executable instructions readable by the at least one processor and operative to: use at least one sensor to sense at least one first physical movement of at least one first object; and compare the at least one first physical movement of at least one first object with at least one second physical movement of at least one second object in at least one piece of content.

14 Claims, 12 Drawing Sheets

INTERACTIVE GAME SYSTEM AND METHODS FOR A TELEVISION AUDIENCE MEMBER TO MIMIC PHYSICAL MOVEMENTS OCCURRING IN TELEVISION BROADCAST CONTENT

FIELD

The present disclosure relates generally to electronic systems, apparatuses, and methods, and more particularly, to systems, methods, and various other disclosures related to electronic games.

PRIORITY CLAIM

The present application is a Continuation-In-Part of and claims priority under 35 U.S.C. Section 119, U.S. Provisional Patent Application Ser. No. 61/358,296, titled "Interactive Game System and Method," filed Jun. 24, 2010, by Isaac S. Daniel, which is hereby incorporated by reference in its entirety as if fully stated herein.

BACKGROUND

For decades people have been watching content at home through different devices, such as televisions, and, more recently, computers. The types of content that have been watched include, but are not limited to, sports events, news, movies, television shows, documentaries, and the like.

For the most part, user interaction with content has been completely passive, meaning that people simply act as audience members to whatever content they are watching. Audience interaction has been limited to media such as text messaging and the internet, through which audience members can participate in contests, for example, that run concurrently with the content.

Often times, the passive nature of today's content leads to boredom, and when people spend large amounts of time watching content it affects their health negatively due to the lack of physical activity while watching content.

SUMMARY

The various systems and methods described herein result from the realization that content can be made more interactive, entertaining, and healthy to watch by using at least one sensor to sense at least one first physical movement of at least one object, such as a person or an inanimate object, and compare the that object's movement to the physical movement of at least one object in at least one piece of content.

Accordingly, the various embodiments and disclosures described herein solve the limitations of the prior art in a new and novel manner.

DETAILED DESCRIPTION OF PREFERRED EMBODIMENTS

System Level Overview

Figure 1A:
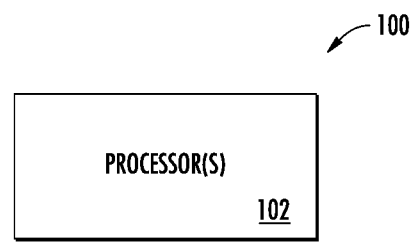
FIGS. 1A through 1E show various embodiments of a system.
Figure 1B:
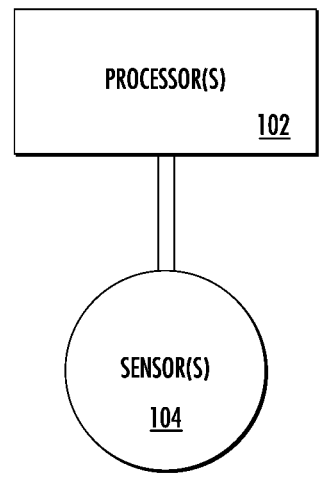
Figure 1C:
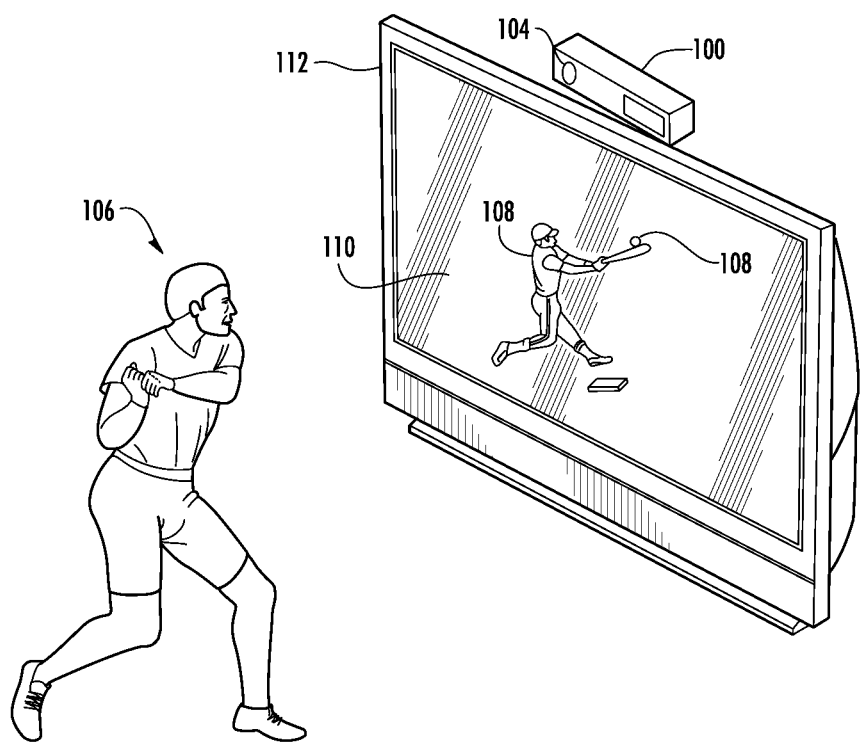
Figure 1D:
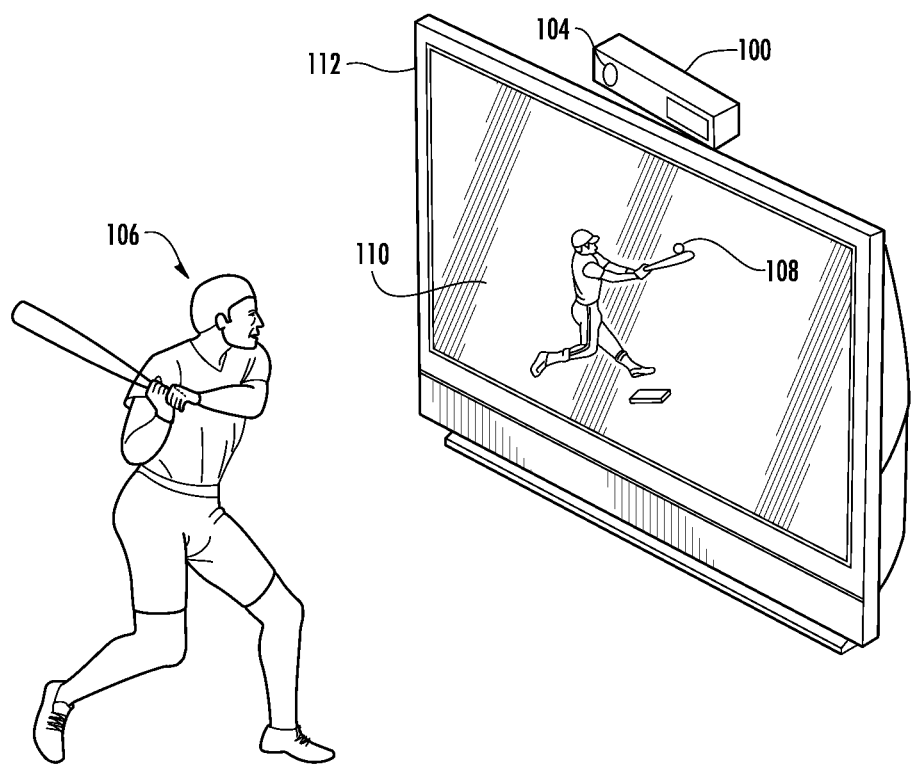
Figure 1E:
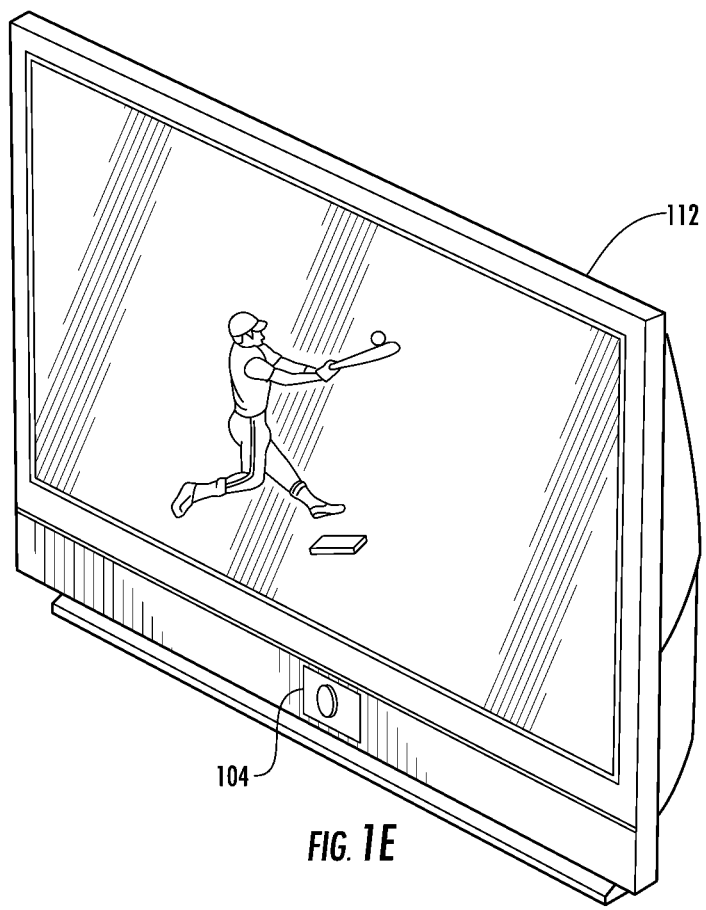

With reference to the drawings, FIG. 1A shows an embodiment of system 100, wherein system 100 comprises at least one processor 102, and computer executable instructions (not shown) readable by the at least one processor and operative use at least one sensor (shown as 104 in FIGS. 1B-1D) to sense at least one first physical movement of at least one first object (shown as 106 in FIGS. 1C and 1D) and compare the at least one first physical movement of the at least one first object 106 to at least one second physical movement of at least one second physical object (shown as 108 in FIGS. 1C and 1D) in at least one piece of content (shown as 110 in FIGS. 1C and 1D).

In some embodiments, at least one processor 102 may be any type of processor, including, but not limited to, a single core processor, a multi core processor, a video processor, and the like.

In some embodiments, at least one sensor 104 may be any type of sensor, including, but not limited to, a camera, an infrared camera, a panoramic sensor, a stereo sensor, a three dimensional sensor and/or camera ("3D sensor"), a thermal imaging camera, a video sensor, a digital camera, and the like. At least one sensor 104 may include a light source, such as an infrared light source, a laser, or a flash, which may be used to illuminate the objects in the sensor's field of view. In preferred embodiments, at least one sensor 104 may include a field of view that encompasses the same field of view as, or larger than, a device (shown as 112 in FIGS. 1C and 1D), such as a display device. In a further embodiment, at least one sensor 104 may include a one hundred and eighty degree field of view, such as by including an ultra wide angle lens. In embodiments where at least one sensor 104 comprises a 3D sensor and/or camera, at least one sensor 104 may be any type of 3D sensor and/or camera, such as a time of flight camera, a structured light camera, a modulated light camera, a triangulation camera, and the like, including, but not limited to, those cameras developed and manufactured by PMDTechnologies, GmbH, Am Eichenhang 50, D-57076 Siegen, Germany; Canesta, Inc., 1156 Sonora Court, Sunnyvale, Calif., 94086, USA; Optrima, NV, Witherenstraat 4, 1040 Brussels, Belgium; Primesense, of Israel; and the Bidirectional Screen developed by the Massachusetts Institute of Technology. In an alternate embodiment, at least one sensor 104 may comprise an accelerometer or gyroscopic sensor.

The computer executable instructions may be loaded directly on at least one processor 102, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In a further embodiment, at least one processor 102 may be electronically connected to at least one sensor 104, as shown in FIG. 1B. The terms "electronically connected," "electronic connection," and the like, as used throughout the present disclosure, are intended to describe any type of electronic connection or electronic communication, such as, but not limited to, a physically connected or wired electronic connection and/or a wireless electronic connection, such as a direct connection, or a connection through a network, such as the internet.

In some embodiments, at least one piece of content 110 may be any type of content, such as, but not limited to, sports content, movie content, live content, music content, arts content, news content, television content, game content, and the like. At least one piece of content 110 may be played on a device 112, such as a display device. The display device may be any type of display device, such as, but not limited to, a television, a computer monitor, a laptop screen, a mobile phone screen, a projector, a projection screen, or any other type of screen and/or display device.

In yet a further embodiment, at least one sensor 104 may be positioned near device 112, such as, but not limited to, on top of or above device 112, in front of device 112, behind device 112, below device 112, to the side of device 112, or integrated with device 112, such as being built into device 112 (as shown in FIG. 1.E). In an alternate embodiment, at least one sensor 104 may be positioned near at least one first object 106, such as, but not limited to, on top of or above at least one first object 106, in front of at least one first object 106, behind at least one first object 106, below at least one first object 106, or to the side of at least one first object 106. In yet another embodiment, at least one sensor 104 may be integrated, connected, or attached to at least one first object 106.

In some embodiments, at least one first object 106 may be an animate object, such as, but not limited to, a person (as shown in FIG. 1C) or an animal. In an alternate embodiment, at least one first object 106 may be an inanimate object, such as a game controller, or a user instrument, such as, but not limited to, musical instruments, tools, household objects, and sports equipment, such as, but not limited to, a stick, a baseball bat, a ball, a racket, a club, a paddle, a ring, and the like. In a further embodiment, at least one first object 106 may comprise both animate and inanimate objects, such as, but not limited to, a person holding an instrument, such as a piece of sports equipment (as shown in FIG. 1D).

Accordingly, in various embodiments, at least one first physical movement of at least one first object 106 may be any type of movement, including but not limited to, a dance movement, sports movement, such as, but not limited to, a throwing movement, a swinging movement, a jumping movement, a running movement, a diving movement, a flying movement, a shooting movement, a driving movement, a dancing movement, and the like, or any arbitrary movement.

In some embodiments, using at least one sensor to sense at least one first physical movement of at least one first object 106 comprises tracking at least one first physical movement of at least one first object 106. In a further embodiment, the at least one first movement may be stored and/or transmitted to a central station or a remote station.

In some embodiments, at least one second object 108 may be an animate object, such as, but not limited to, a person (as shown in FIG. 1C) or an animal. In an alternate embodiment, at least one second object 108 may be an inanimate object, such as a game controller, or a user instrument, such as, but not limited to, musical instruments, tools, household objects, and sports equipment, such as, but not limited to, a stick, a baseball bat, a ball, a racket, a club, a paddle, a ring, and the like. In a further embodiment, at least one second object 108 may comprise both animate and inanimate objects, such as, but not limited to, a person holding an instrument, such as a piece of sports equipment (as shown in FIG. 1D).

Accordingly, in various embodiments, at least one second physical movement of at least one second object 108 may be any type of movement, including but not limited to, a dance movement, sports movement, such as, but not limited to, a throwing movement, a swinging movement, a jumping movement, flying movement, a running movement, a diving movement, a shooting movement, a driving movement, a dancing movement, and the like, or any arbitrary movement.

In some embodiments, the second physical movement may be the physical movement of at least one second object 108 in at least one piece of content 110. Accordingly, it may be the movement of a person, such as a sports participant, or the object of a sport, such as a ball.

In some embodiments, using at least one sensor to sense at least one second physical movement of at least one second object 108 comprises tracking at least one second physical movement of at least one second object 108. In a further embodiment, the at least one second movement may be stored and/or transmitted to a central station or a remote station.

In yet another embodiment, the computer executable instructions may be further operative to determine whether the at least one first physical movement of at least one first object 106 and the at least one second physical movement of at least one second object 108 in at least one piece of content 110 coincide. In one embodiment, determining whether the at least one first physical movement and the at least one second physical movement coincide comprises determining whether the at least one first physical movement and the at least one second physical movement are similar.

The term "coincide," as used herein, refers to the relationship of the at least one first physical movement and the at least one second physical movement, and may imply that both movements somehow or other match, correspond, or are related in a way so as to be a complimentary to each other or dovetail with each other. One such example is the physical movement of a ball in a sport which coincides with the physical movement of a player or piece of equipment attempting to touch, strike, or block the ball. Another example is the physical movement of a player acting in a sport, such as by throwing a ball, running, and the like, which coincides with the physical movement of an audience member attempting to mimic, imitate, follow, or counteract the player's movements. The present disclosure should not be limited to physical movements in sports, but may be applied to other fields as well, such as the arts, including dance, and the like, and exercise, movies, or television programs.

In embodiments where at least one first object 106 is a person, determining whether the two physical movements coincide may include comparing the movement of a person watching a sports event to the movement of a person or object playing in the sports event. In some embodiments, this may include comparing whether a person watching the content reacts appropriately to the activity going on in the content, such as in the case of a baseball game, where the person watching the baseball game may be attempting to imitate the swing of a baseball player playing in the baseball game, or may be attempting to make a movement so as to virtually "hit" a ball that is being pitched in the game that is being played as content 110, or throw a ball to a receiver in a football game. In other embodiments, the content 110 may be non-sport content, such as a movie, whereby a person watching the movie may be attempting to react in a certain way to the movie, such as by jumping up and down or making running movement when such movement is called for in the movie.

In a further embodiment, the computer executable instructions may be operative to conduct a game based on whether the at least one first physical movement of at least one first object 106 and the at least one second physical movement of the at least one second object 108 in at least one piece of content 110 coincide. In some embodiments, the game may include determining a score based on whether the at least one first physical movement of at least one first object 106 and the at least one second physical movement of at least one second object 108 in at least one piece of content coincide. In an exemplary embodiment, when it is determined that the at least one first physical movement of at least one first object 106 and the at least one second physical movement of the at least one second object 108 in at least one piece of content 110 coincide, a user may be allotted a certain amount of points. The amount of points may vary based on how well the movements coincide.

In yet another embodiment, the computer executable instructions may be further operative to transmit or receive information. The information may include information about content 110, such as information relating to the physical movements within content 110, such as the at least one second physical movement of at least one second object 108 in content 110. In some embodiments, the information may include information relating to at least one first object 106, such as, but not limited to, to the physical movements of at least one first object 106. In another embodiment, the information may include game information, such as the score of the game being played by at least one object 106.

In some embodiments, the computer executable instructions may be operative to transmit or receive information to or from a central station, such as a server or a television station, which may comprise a system similar to system 100. In another embodiment, the computer executable instructions may be operative to transmit or receive information to or from a remote station, such as a user system, which may comprise a system similar to system 100.

In another embodiment, the computer executable instructions may be operative to use a communications means for transmitting or receiving information, wherein the communications means may comprise a wired communications means, such as a land line modem, cable modem, DSL modem, and the like, or a wireless communications means, such as a wireless modem, a GSM modem, a satellite modem, and Wi-Fi adapter, and the like.

In some embodiments, system 100 may be integrated with or may be a component of a user system or a central station, such as a computer, a gaming console, a set top box, a display device, or a server.

In another embodiment, at least one processor 302 may be electronically connected to at least one sensor 104. In yet another embodiment, at least one processor may be positioned near, such as in the same location as, at least one of at least one sensor 104 and at least one object 106. In yet another embodiment, at least one processor 102 may be integrated with at least one sensor 104. In yet another embodiment, at least one processor 102 may be positioned at a location remote from at least one of at least one sensor 104 and at least one object 106, such as, but not limited to, by being located at a central station, such as a television station or a server, such as a game server.

Figure 2A:
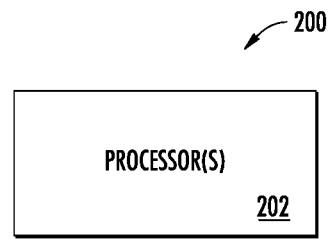
FIGS. 2A and 2B show various other embodiments of a system.
Figure 2B:
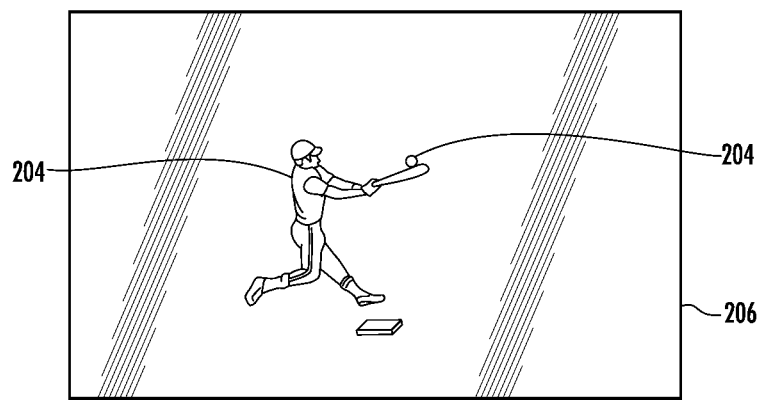

Referring now to FIGS. 2A and 2B, an embodiment of system 200 is shown, wherein system 200 comprises at least one processor 202, and computer executable instructions (not shown) readable by the at least one processor and operative to transmit or receive information about at least one physical movement of at least one object 204 in at least one piece of content 206.

In some embodiments, at least one processor 202 may be any type of processor, including, but not limited to, a single core processor, a multi core processor, a video processor, and the like.

The computer executable instructions may be loaded directly on at least one processor 202, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

Accordingly, in various embodiments, the at least one physical movement of at least one object 204 may be any type of movement, such as the movement of a person or an inanimate object, including but not limited to, a dance movement, sports movement, such as, but not limited to, a throwing movement, a swinging movement, a jumping movement, flying movement, a running movement, a diving movement, a shooting movement, a driving movement, a dancing movement, and the like, or any arbitrary movement.

In some embodiments, at least one piece of content 206 may be any type of content, such as, but not limited to, sports content, movie content, live content, music content, arts content, news content, television content, game content, and the like. At least one piece of content 206 may be played on a device, such as a display device. The display device may be any type of display device, such as, but not limited to, a television, a computer monitor, a laptop screen, a mobile phone screen, a projector, a projection screen, or any other type of screen and/or display device.

In some embodiments, the information about the at least one physical movement of at least one object 204 may be extracted from content 206 using object recognition software, and/or gesture control software, such as those developed by Softkinetic S.A., 24 Avenue L. Mommaerts, Brussels, B-1140, Belgium, and Microsoft Corp. In another embodiment, information about the at least one physical movement of at least one object 204 may be provided by a user. In some embodiments, the at least one physical movement of at least one object 204 may be captured using at least one sensor, which may be similar to at least one sensor 104 described above with reference to FIGS. 1A through 1E.

In another embodiment, the computer executable instructions may be operative to transmit or receive information about at least one physical movement of at least one object 204 in at least one piece of content 206 to or from at least one central station, such as a television station, a server, or a user monitoring station, or at least one remote station, such as a user system, which may comprise a system similar to system 100, described above with reference to FIGS. 1A through 1E.

Accordingly, in one embodiment, the computer executable instructions are operative to transmit or receive information to or from at least one remote station or at least one central station about at least one physical movement of at least one object sensed by at least one sensor. In yet a further embodiment, the computer executable instructions may be operative to compare the information transmitted or received from the at least one remote station or at least one central station with information about at least one second physical motion of at least one second object. In yet another embodiment, the computer executable instructions may be operative to determine a score based on the information transmitted or received from the at least one remote station or at least one central station.

In another embodiment, the computer executable instructions may be operative to use a communications means for transmitting or receiving information, wherein the communications means may comprise a wired communications means, such as a land line modem, cable modem, DSL modem, and the like, or a wireless communications means, such as a wireless modem, a GSM modem, a satellite modem, and Wi-Fi adapter, and the like.

Figure 3:
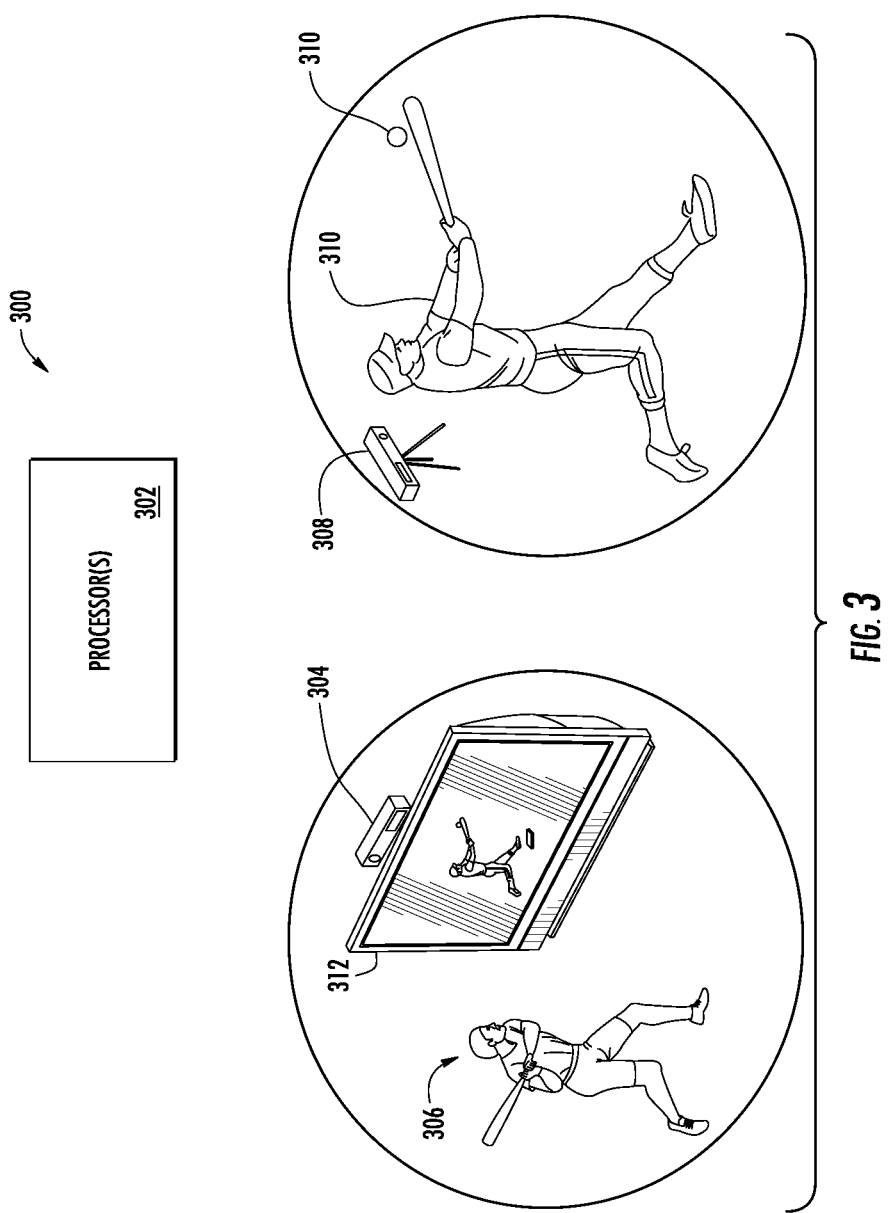
FIG. 3 shows a system in accordance with one embodiment.

Referring now to FIG. 3, an embodiment of system 300 is shown, wherein system 300 comprises at least one processor 302 and computer executable instructions (not shown) readable by at least one processor 302 and operative to use at least one first sensor 304 to sense at least one first physical movement of at least one first object 306, use at least one second sensor 308 to sense at least one second physical movement of at least one second object 310, and compare the at least one first physical movement of at least one first object 306 with the at least one second physical movement of at least one second object 310.

In some embodiments, at least one processor 302 may be any type of processor, including, but not limited to, a single core processor, a multi core processor, a video processor, and the like.

The computer executable instructions may be loaded directly on at least one processor 302, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In some embodiments, at least one piece of content 206 may be any type of content, such as, but not limited to, sports content, movie content, live content, music content, arts content, news content, television content, game content, and the like. At least one piece of content 206 may be played on a device, such as a display device. The display device may be any type of display device, such as, but not limited to, a television, a computer monitor, a laptop screen, a mobile phone screen, a projector, a projection screen, or any other type of screen and/or display device.

In some embodiments, the information about the at least one physical movement of at least one object 204 may be extracted from content 206 using object recognition software, and/or gesture control software, such as those developed by Softkinetic S.A., 24 Avenue L. Mommaerts, Brussels, B-1140, Belgium, and Microsoft Corp. In another embodiment, information about the at least one physical movement of at least one object 204 may be provided by a user. In some embodiments, the at least one physical movement of at least one object 204 may be captured using at least one sensor, which may be similar to at least one sensor 104 described above with reference to FIGS. 1A through 1E.

In some embodiments, sensors 304 and 308 may be any type of sensor, including, but not limited to, a camera, an infrared camera, a panoramic sensor, a stereo sensor, a three dimensional sensor and/or camera ("3D sensor"), a thermal imaging camera, a video sensor, a digital camera, and the like. Sensors 304 and 308 may include a light source, such as an infrared light source, a laser, or a flash, which may be used to illuminate the objects in the sensor's field of view. In preferred embodiments, sensors 304 and 308 may include a field of view that encompasses the same field of view as, or larger than, a device (shown as 112 in FIGS. 1C and 1D), such as a display device. In a further embodiment, sensors 304 and 308 may include a one hundred and eighty degree field of view, such as by including an ultra wide angle lens. In embodiments where sensors 304 and 308 comprise a 3D sensor and/or camera, sensors 304 and 308 may be any type of 3D sensor and/or camera, such as a time of flight camera, a structured light camera, a modulated light camera, a triangulation camera, and the like, including, but not limited to, those cameras developed and manufactured by PMDTechnologies, GmbH, Am Eichenhang 50, D-57076 Siegen, Germany; Canesta, Inc., 1156 Sonora Court, Sunnyvale, Calif., 94086, USA; Primesense of Israel; Optrima, NV, Witherenstraat 4, 1040 Brussels, Belgium; and the Bidirectional Screen developed by the Massachusetts Institute of Technology. In an alternate embodiment, sensors 304 and 308 may comprise an accelerometer or gyroscopic sensor.

In one embodiment, at least one processor 302 may be electronically connected to at least one of at least one first sensor 304 or at least one second sensor 306.

In yet a further embodiment, at least one first sensor 304 may be positioned near a device 312 (e.g. a display device), such as, but not limited to, on top of or above device 312, in front of device 312, behind device 312, below device 312, to the side of device 312, or integrated with device 312, such as being built into device 312 (as shown in FIG. 3). In an alternate embodiment, at least one first sensor 304 may be positioned near at least one first object 306, such as, but not limited to, on top of or above at least one first object 306, in front of at least one first object 306, behind at least one first object 306, below at least one first object 306, or to the side of at least one first object 306. In yet another embodiment, at least one first sensor 304 may be integrated, connected, or attached to at least one first object 306.

In yet a further embodiment, at least one second sensor 308 may be positioned near at least one second object 310, such as, but not limited to, on top of or above at least one second object 310, in front of at least one second object 310, behind at least one second object 310, below at least one second object 310, or to the side of at least one second object 310. In yet another embodiment, at least one sensor 308 may be integrated, connected, or attached to at least one second object 310.

In some embodiments, at least one first object 306 may be an animate object, such as, but not limited to, a person (as shown in FIG. 3) or an animal. In an alternate embodiment, at least one first object 306 may be an inanimate object, such as a game controller, or a user instrument, such as, but not limited to, musical instruments, tools, household objects, and sports equipment, such as, but not limited to, a stick, a baseball bat, a ball, a racket, a club, a paddle, a ring, and the like. In a further embodiment, at least one first object 306 may comprise both animate and inanimate objects, such as, but not limited to, a person holding an instrument, such as a piece of sports equipment (as shown in FIG. 3).

Accordingly, in various embodiments, at least one first physical movement of at least one first object 306 may be any type of movement, including but not limited to, a dance movement, sports movement, such as, but not limited to, a throwing movement, a swinging movement, a jumping movement, a running movement, a diving movement, a flying movement, a shooting movement, a driving movement, a dancing movement, and the like, or any arbitrary movement.

In some embodiments, using at least one sensor to sense at least one first physical movement of at least one first object 306 comprises tracking at least one first physical movement of at least one first object 306. In a further embodiment, the at least one first movement may be stored and/or transmitted to a central station or a remote station, of which at least one processor 302 may be a part.

In some embodiments, at least one second object 310 may be an animate object, such as, but not limited to, a person (as shown in FIG. 3) or an animal. In an alternate embodiment, at least one second object 310 may be an inanimate object, such as a game controller, or a user instrument, such as, but not limited to, musical instruments, tools, household objects, and sports equipment, such as, but not limited to, a stick, a baseball bat, a ball, a racket, a club, a paddle, a ring, and the like. In a further embodiment, at least one second object 310 may comprise both animate and inanimate objects, such as, but not limited to, a person holding an instrument, such as a piece of sports equipment (as shown in FIG. 3).

Accordingly, in various embodiments, at least one second physical movement of at least one second object 310 may be any type of movement, including but not limited to, a dance movement, sports movement, such as, but not limited to, a throwing movement, a swinging movement, a jumping movement, flying movement, a running movement, a diving movement, a shooting movement, a driving movement, a dancing movement, and the like, or any arbitrary movement.

In some embodiments, the second physical movement may be the physical movement of at least one second object 310 in at least one piece of content not shown. Accordingly, it may be the movement of a person, such as a sports participant, or the object of a sport, such as a ball.

In some embodiments, using at least one sensor to sense at least one second physical movement of at least one second object 310 comprises tracking at least one second physical movement of at least one second object 310. In a further embodiment, the at least one second movement may be stored and/or transmitted to a central station or a remote station, of which at least one processor 302 may be a part.

In another embodiment, the computer executable instructions may be operative to determine whether the at least one first physical movement and the at least one second physical movement coincide, or, in other words, whether the physical movements of at least one first object 306 and at least one second object 310 coincide. In one embodiment, determining whether the at least one first physical movement and the at least one second physical movement coincide comprises determining whether the at least one first physical movement and the at least one second physical movement are similar.

The term "coincide," as used herein, refers to the relationship of the at least one first physical movement and the at least one second physical movement, and may imply that both movements somehow or other match, correspond, or are related in a way so as to be a complimentary to each other or dovetail with each other. One such example is the physical movement of a ball in a sport which coincides with the physical movement of a player or piece of equipment attempting to touch, strike, or block the ball. Another example is the physical movement of a player acting in a sport, such as by throwing a ball, running, and the like, which coincides with the physical movement of an audience member attempting to mimic, imitate, follow, or counteract the player's movements. The present disclosure should not be limited to physical movements in sports, but may be applied to other fields as well, such as the arts, including dance, and the like, and exercise, movies, or television programs.

In embodiments where at least one first object 306 is a person, determining whether the two physical movements coincide may include comparing the movement of a person watching a sports event to the movement of a person or object playing in the sports event (shown as object 310 in FIG. 3). In some embodiments, this may include comparing whether a person watching the content reacts appropriately to the activity going on in the content, such as in the case of a baseball game, where the person watching the baseball game may be attempting to imitate the swing of a baseball player playing in the baseball game, or may be attempting to make a movement so as to virtually "hit" a ball that is being pitched in the game that is being played, or throw a ball to a receiver in a football game. In other embodiments, activity in which at least one second object 310 is participating may be non-sport content, such as a movie, whereby a person watching the movie may be attempting to react in a certain way to the movie, such as by jumping up and down or making running movement when such movement is called for in the movie.

In a further embodiment, the computer executable instructions may be operative to conduct a game based on whether the at least one first physical movement of at least one first object 306 and the at least one second physical movement of the at least one second object 310 coincide. In some embodiments, the game may include determining a score based on whether the at least one first physical movement of at least one first object 306 and the at least one second physical movement of at least one second object 310 coincide. In an exemplary embodiment, when it is determined that the at least one first physical movement of at least one first object 306 and the at least one second physical movement of the at least one second object 310 coincide, a user may be allotted a certain amount of points. The amount of points may vary based on how well the movements coincide.

In another embodiment, at least one processor 302 may be electronically connected to at least one of at least one sensor 304 and at least one sensor 308. In yet another embodiment, at least one processor may be positioned near, such as in the same location as, at least one of at least one sensor 304 and at least one sensor 308. In yet another embodiment, at least one processor 302 may be integrated with at least one of at least one sensor 304 and at least one sensor 308. In yet another embodiment, at least one processor 302 may be positioned at a location remote from at least one of at least one sensor 304 and at least one sensor 308, such as, but not limited to, by being located at a central station, such as a television station or a server, such as a game server.

Figure 4:
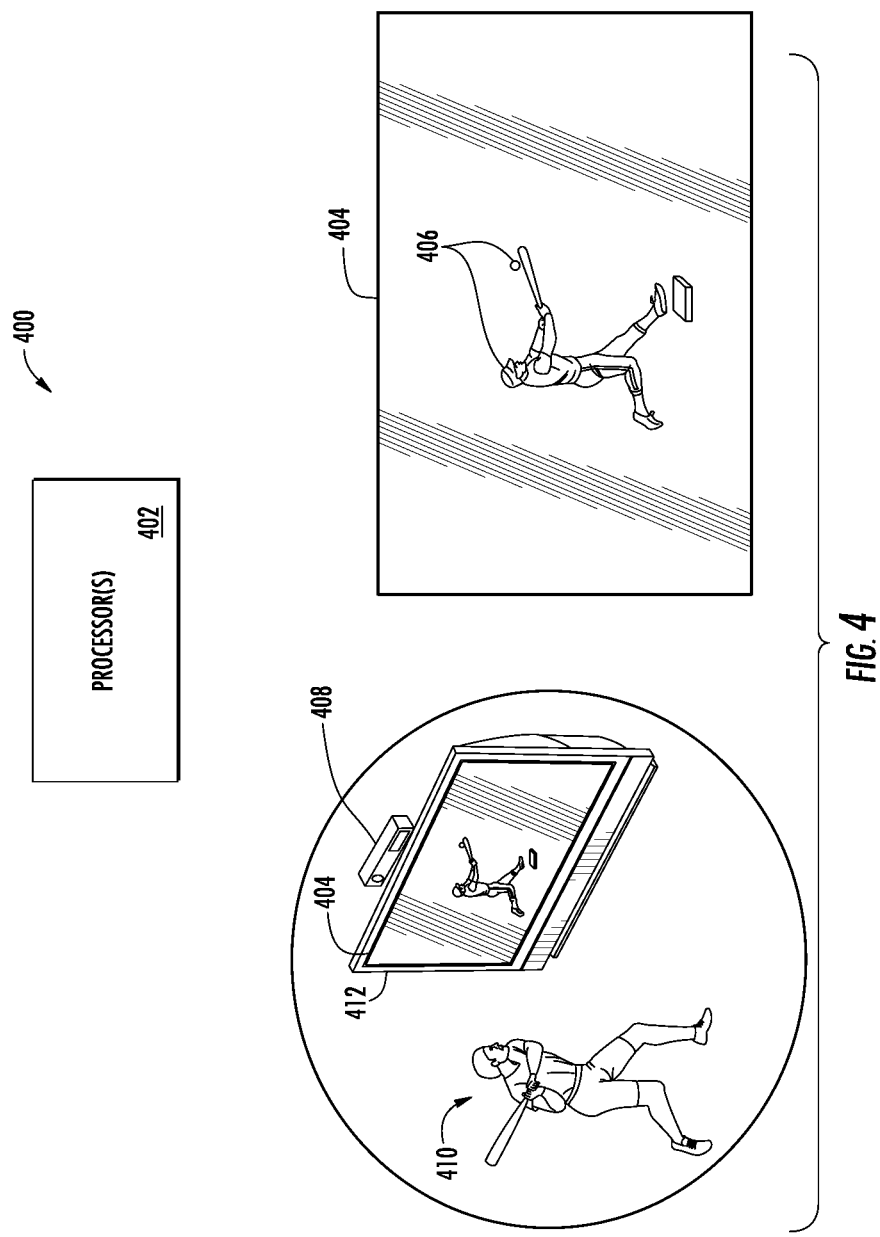
FIG. 4 shows a system in accordance with another embodiment.

Referring now to FIG. 4, at least one embodiment of system 400 is shown, wherein system 400 comprises at least one processor 402, and computer executable instructions (not shown) readable by at least one processor 402 and operative to analyze at least one piece of content 404 to determine at least one first physical movement of at least one first object 406, use at least one second sensor 408 to sense at least one second physical movement of at least one second object 410, and compare the at least one first physical movement of at least one first object 406 with the at least one second physical movement of at least one second object 410.

In some embodiments, at least one processor 402 may be any type of processor, including, but not limited to, a single core processor, a multi core processor, a video processor, and the like.

The computer executable instructions may be loaded directly on at least one processor 402, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In some embodiments, at least one piece of content 404 may be any type of content, such as, but not limited to, sports content, movie content, live content, music content, arts content, news content, television content, game content, and the like. At least one piece of content 404 may be played on a device 412, such as a display device. The display device may be any type of display device, such as, but not limited to, a television, a computer monitor, a laptop screen, a mobile phone screen, a projector, a projection screen, or any other type of screen and/or display device.

In one embodiment, analyzing at least one piece of content 404 to determine at least one first physical movement of at least one first object 406, comprises using object and/or image recognition software, and/or gesture control software, such as those developed by Softkinetic S.A., 24 Avenue L. Mommaerts, Brussels, B-1140, Belgium, and Microsoft Corp. In another embodiment, analyzing at least one piece of content 404 to determine at least one first physical movement of at least one first object 406, comprises using at least one person to analyze at least one piece of content 404 and inputting information about the at least one first physical movement of at least one first object 406 may be provided by a user. In some embodiments, the at least one physical movement of at least one first object 406 may be captured using at least one sensor, which may be similar to at least one sensor 408.

In some embodiments, at least one sensor 408 may be any type of sensor, including, but not limited to, a camera, an infrared camera, a panoramic sensor, a stereo sensor, a three dimensional sensor and/or camera ("3D sensor"), a thermal imaging camera, a video sensor, a digital camera, and the like. At least one sensor 408 may include a light source, such as an infrared light source, a laser, or a flash, which may be used to illuminate the objects in the sensor's field of view. In preferred embodiments, at least one sensor 408 may include a field of view that encompasses the same field of view as, or larger than, a device (shown as 412 in FIG. 4), such as a display device. In a further embodiment, at least one sensor 408 may include a one hundred and eighty degree field of view, such as by including an ultra wide angle lens. In embodiments where at least one sensor 408 comprises a 3D sensor and/or camera, at least one sensor 408 may be any type of 3D sensor and/or camera, such as a time of flight camera, a structured light camera, a modulated light camera, a triangulation camera, and the like, including, but not limited to, those cameras developed and manufactured by PMDTechnologies, GmbH, Am Eichenhang 50, D-57076 Siegen, Germany; Canesta, Inc., 1156 Sonora Court, Sunnyvale, Calif., 94086, USA; Primesense of Israel; Optrima, NV, Witherenstraat 4, 1040 Brussels, Belgium; and the Bidirectional Screen developed by the Massachusetts Institute of Technology. In an alternate embodiment, at least one sensor 408 may comprise an accelerometer or gyroscopic sensor.

In one embodiment, at least one processor 402 may be electronically connected, or in electronic communication, with at least one sensor 408.

In yet a further embodiment, at least one sensor 408 may be positioned near a device 412 (e.g. a display device), such as, but not limited to, on top of or above device 412, in front of device 412, behind device 412, below device 412, to the side of device 412, or integrated with device 412, such as being built into device 412 (as shown in FIG. 1.E). In an alternate embodiment, at least one sensor 408 may be positioned near at least one second object 410, such as, but not limited to, on top of or above at least one second object 410, in front of at least one second object 410, behind at least one second object 410, below at least one second object 410, or to the side of at least one second object 410. In yet another embodiment, at least one first sensor 408 may be integrated, connected, or attached to at least one second object 410.

In some embodiments, at least one first object 406 may be an animate object, such as, but not limited to, a person (as shown in FIG. 4) or an animal. In an alternate embodiment, at least one first object 406 may be an inanimate object, such as a game controller, or a user instrument, such as, but not limited to, musical instruments, tools, household objects, and sports equipment, such as, but not limited to, a stick, a baseball bat, a ball, a racket, a club, a paddle, a ring, and the like. In a further embodiment, at least one first object 406 may comprise both animate and inanimate objects, such as, but not limited to, a person holding an instrument, such as a piece of sports equipment (as shown in FIG. 4).

Accordingly, in various embodiments, at least one first physical movement of at least one first object 406 may be any type of movement, including but not limited to, a dance movement, sports movement, such as, but not limited to, a throwing movement, a swinging movement, a jumping movement, a running movement, a diving movement, a flying movement, a shooting movement, a driving movement, a dancing movement, and the like, or any arbitrary movement.

In some embodiments, using at least one sensor 408 to sense at least one first physical movement of at least one second object 410 comprises tracking at least one second physical movement of at least one second object 410. In a further embodiment, the at least one second physical movement may be stored and/or transmitted to a central station or a remote station, of which at least one processor 402 may be a part.

In some embodiments, at least one second object 410 may be an animate object, such as, but not limited to, a person (as shown in FIG. 4) or an animal. In an alternate embodiment, at least one second object 410 may be an inanimate object, such as a game controller, or a user instrument, such as, but not limited to, musical instruments, tools, household objects, and sports equipment, such as, but not limited to, a stick, a baseball bat, a ball, a racket, a club, a paddle, a ring, and the like. In a further embodiment, at least one second object 410 may comprise both animate and inanimate objects, such as, but not limited to, a person holding an instrument, such as a piece of sports equipment (as shown in FIG. 4).

Accordingly, in various embodiments, at least one second physical movement of at least one second object 410 may be any type of movement, including but not limited to, a dance movement, sports movement, such as, but not limited to, a throwing movement, a swinging movement, a jumping movement, flying movement, a running movement, a diving movement, a shooting movement, a driving movement, a dancing movement, and the like, or any arbitrary movement.

In some embodiments, the second physical movement may be the physical movement of at least one second object 410 in at least one piece of content not shown. Accordingly, it may be the movement of a person, such as a sports participant, or the object of a sport, such as a ball.

In some embodiments, using at least one sensor to sense at least one second physical movement of at least one second object 410 comprises tracking at least one second physical movement of at least one second object 410. In a further embodiment, the at least one second movement may be stored and/or transmitted to a central station or a remote station, of which at least one processor 402 may be a part.

In another embodiment, the computer executable instructions may be operative to determine whether the at least one first physical movement and the at least one second physical movement coincide, or, in other words, whether the physical movements of at least one first object 406 and at least one second object 410 coincide. In one embodiment, determining whether the at least one first physical movement and the at least one second physical movement coincide comprises determining whether the at least one first physical movement and the at least one second physical movement are similar.

The term "coincide," as used herein, refers to the relationship of the at least one first physical movement and the at least one second physical movement, and may imply that both movements somehow or other match, correspond, or are related in a way so as to be a complimentary to each other or dovetail with each other. One such example is the physical movement of a ball in a sport which coincides with the physical movement of a player or piece of equipment attempting to touch, strike, or block the ball. Another example is the physical movement of a player acting in a sport, such as by throwing a ball, running, and the like, which coincides with the physical movement of an audience member attempting to mimic, imitate, follow, or counteract the player's movements. The present disclosure should not be limited to physical movements in sports, but may be applied to other fields as well, such as the arts, including dance, and the like, and exercise, movies, or television programs.

In embodiments where at least one second object 410 is a person, determining whether the two physical movements coincide may include comparing the movement of a person watching a sports event to the movement of a person or object playing in the sports event (shown as object 406 in FIG. 4). In some embodiments, this may include comparing whether a person watching the content reacts appropriately to the activity going on in the content, such as in the case of a baseball game, where the person watching the baseball game may be attempting to imitate the swing of a baseball player playing in the baseball game, or may be attempting to make a movement so as to virtually "hit" a ball that is being pitched in the game that is being played, or throw a ball to a receiver in a football game. In other embodiments, activity in which at least one first object 406 is participating may be non-sport content, such as a movie, whereby a person watching the movie may be attempting to react in a certain way to the movie, such as by jumping up and down or making running movement when such movement is called for in the movie.

In a further embodiment, the computer executable instructions may be operative to conduct a game based on whether the at least one first physical movement of at least one first object 406 and the at least one second physical movement of the at least one second object 410 coincide. In some embodiments, the game may include determining a score based on whether the at least one first physical movement of at least one first object 406 and the at least one second physical movement of at least one second object 410 coincide. In an exemplary embodiment, when it is determined that the at least one first physical movement of at least one first object 406 and the at least one second physical movement of the at least one second object 410 coincide, a user may be allotted a certain amount of points. The amount of points may vary based on how well the movements coincide.

In another embodiment, at least one processor 402 may be electronically connected to at least one sensor 408. In yet another embodiment, at least one processor may be positioned near, such as in the same location as, at least one sensor 408. In yet another embodiment, at least one processor 402 may be integrated with at least one sensor 408. In yet another embodiment, at least one processor 402 may be positioned at a location remote from at least one of at least one sensor 408, such as, but not limited to, by being located at a central station, such as a television station or a server, such as a game server.

Figure 5:
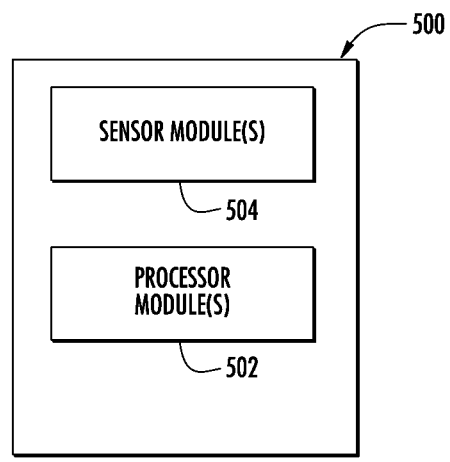
FIG. 5 shows a system in accordance with yet another embodiment.

Referring now to FIG. 5, one embodiment of system 500 is shown, comprising at least one sensor module 504 to sense at least one first physical movement of at least one first object and at least one processor module 502 to compare the at least one first physical movement of at least one first object with at least one second physical movement of at least one second object in at least one piece of content.

In one embodiment at least one processor module 502 may comprise a software aspect, such as, but not limited to, processing software, such as processing computer program, an operating system, and the like. In another embodiment, at least one processor module 502 may comprise a hardware aspect, such as a computer processor. In some embodiments, at least one processor module 502 may be any type of processor, including, but not limited to, a single core processor, a multi core processor, a video processor, and the like. In yet another embodiment, at least one processor module 502 may comprise both a software aspect and a hardware aspect.

In some embodiments, at least one sensor module 504 may comprise a hardware aspect, such as, but not limited to, a sensor. In such embodiments, at least one sensor module 504 may be any type of sensor module, including, but not limited to, a camera, an infrared camera, a panoramic sensor, a stereo sensor, a three dimensional sensor and/or camera ("3D sensor"), a thermal imaging camera, a video sensor, a digital camera, and the like. At least one sensor module 504 may include a light source, such as an infrared light source, a laser, or a flash, which may be used to illuminate the objects in the sensor's field of view. In preferred embodiments, at least one sensor module 504 may include a field of view that encompasses the same field of view as, or larger than, a device, such as a display device. In a further embodiment, at least one sensor module 504 may include a one hundred and eighty degree field of view, such as by including an ultra wide angle lens. In embodiments where at least one sensor module 504 comprises a 3D sensor and/or camera, at least one sensor module 504 may be any type of 3D sensor and/or camera, such as a time of flight camera, a structured light camera, a modulated light camera, a triangulation camera, and the like, including, but not limited to, those cameras developed and manufactured by PMDTechnologies, GmbH, Am Eichenhang 50, D-57076 Siegen, Germany; Canesta, Inc., 1156 Sonora Court, Sunnyvale, Calif., 94086, USA; Primesense of Israel; Optrima, NV, Witherenstraat 4, 1040 Brussels, Belgium; and the Bidirectional Screen developed by the Massachusetts Institute of Technology. In an alternate embodiment, at least one sensor module 504 may comprise an accelerometer or gyroscopic sensor.

In yet another embodiment, at least one sensor module 504 may comprise a software aspect, such as a computer program. In such an embodiment, at least one sensor module 504 may comprise sensor and/or camera firmware, or object or image recognition software, and/or gesture control software, such as those developed by Softkinetic S.A., 24 Avenue L. Mommaerts, Brussels, B-1140, Belgium, and Microsoft Corp.

In yet another embodiment, at least one sensor module 504 may comprise both a software aspect and a hardware aspect.

In one embodiment, at least one processor module 502 may be electronically connected, electronic communication, or in software communication with at least one sensor module 504.

In embodiments where at least one first object is a person, at least one processor module 502 may be operative to determine whether the two physical movements coincide, which may include comparing the movement of a person watching a sports event to the movement of a person or object playing in the sports event. In some embodiments, this may include comparing whether a person watching the at least one piece of content reacts appropriately to the activity going on in the content, such as in the case of a baseball game, where the person watching the baseball game may be attempting to imitate the swing of a baseball player playing in the baseball game, or may be attempting to make a movement so as to virtually "hit" a ball that is being pitched in the game that is being played as the at least one piece of content, or throw a ball to a receiver in a football game. In other embodiments, the at least one piece of content may be non-sport content, such as a movie, whereby a person watching the movie may be attempting to react in a certain way to the movie, such as by jumping up and down or making running movement when such movement is called for in the movie.

In a further embodiment, system 500 comprises at least one display module to display the at least one piece of content. The at least one display module may comprise a hardware aspect, such as a display device, which may include, but is not limited to, a television, a projector and/or projector screen, a computer monitor, and the like. In another embodiment, the at least one display module may comprise a software aspect, such as a display computer program or software, such as, but not limited to, a media player, display drivers, and the like. In yet another embodiment, the at least one display module may comprise both a hardware aspect and a software aspect.

In yet another embodiment, system 500 may comprise at least one communications module to transmit or receive information. The information may comprise any type of information, such as, but not limited to, game information based on the physical movements of the objects, or information on the physical movements of the at least one first object and the at least one second object, such as those types of information described above with reference to FIGS. 1 through 4.

In one embodiment, the at least one communications module may comprise a hardware aspect, such as but not limited to, wireless communications hardware, such as, but not limited to, a wireless modem, a GSM modem, a Wi-Fi modem, an antenna, a satellite modem, a Bluetooth modem, and the like, or wired hardware, such as a DSL modem, a cable modem, a network card, a telephone modem, and the like. In yet another embodiment, the at least one communications module may comprise a software aspect, such as, but not limited to, a computer program or software, such as, but not limited to, a communications program, communications protocol, and the like. In yet another embodiment, the at least one communications module may comprise both a hardware aspect and a software aspect.

Figure 6:
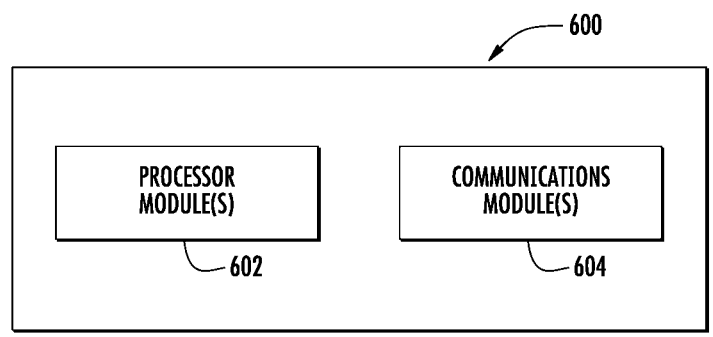
FIG. 6 shows a system in accordance with yet another embodiment.

Referring now to FIG. 6, at least one embodiment of system 600 is shown, wherein system 600 comprises at least one processor module 602 to compare at least one first physical movement of at least one first object with at least one second physical movement of at least one second object, and at least one communications module 604 to transmit or receive information.

In one embodiment at least one processor module 602 may comprise a software aspect, such as, but not limited to, processing software, such as processing computer program, an operating system, and the like. In another embodiment, at least one processor module 602 may comprise a hardware aspect, such as a computer processor. In some embodiments, at least one processor module 602 may be any type of processor, including, but not limited to, a single core processor, a multi core processor, a video processor, and the like. In yet another embodiment, at least one processor module 602 may comprise both a software aspect and a hardware aspect.

The information may comprise any type of information, such as, but not limited to, game information based on the physical movements of the objects, or information on the physical movements of the at least one first object and the at least one second object, such as those types of information described above with reference to FIGS. 1 through 4.

In one embodiment, at least one communications 604 module may comprise a hardware aspect, such as but not limited to, wireless communications hardware, such as, but not limited to, a wireless modem, a GSM modem, a Wi-Fi modem, an antenna, a satellite modem, a Bluetooth modem, and the like, or wired hardware, such as a DSL modem, a cable modem, a network card, a telephone modem, and the like. In yet another embodiment, at least one communications module 604 may comprise a software aspect, such as, but not limited to, a computer program or software, such as, but not limited to, a communications program, communications protocol, and the like. In yet another embodiment, at least one communications 604 module may comprise both a hardware aspect and a software aspect.

In yet another embodiment, system 600 may comprise at least one server module to host a game. In some embodiments, the game may be a game based on the at least one first physical movement of the at least one first object and the at least one second physical movement of the at least one second object. In yet another embodiment, the game may include determining whether the at least one first physical movement of the at least one first object and the at least one second physical movement of the at least one second object coincide.

In some embodiments, the at least one server module may comprise a hardware aspect, such, as but not limited to, server hardware, such as, but not limited to, a server processor, a server computer, and the like. In yet another embodiment, the at least one server module may comprise a software aspect, such as, but not limited to, a computer program and/or software, such as, but not limited to, server software, game hosting software, and the like. In a further embodiment, the at least one server module may comprise both a software aspect and a hardware aspect.

Figure 7:
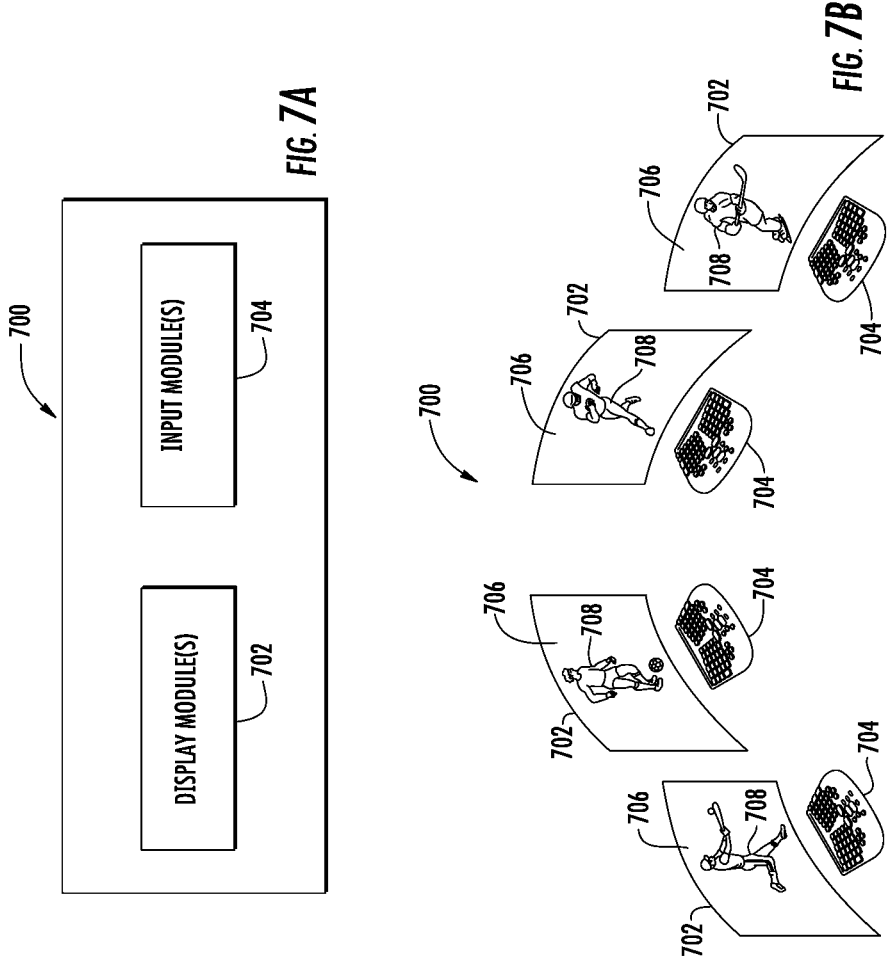
FIGS. 7A and 7B show a system in accordance with various embodiments.

Referring now to FIG. 7A, at least one embodiment of system 700 is shown, wherein system 700 comprises at least one display module 702 to display at least one piece of content, and at least one input module 704 to receive information about at least one physical movement of at least one object in the at least one piece of content.

In one embodiment, at least one display module 702 may comprise a hardware aspect, such as a display device, which may include, but is not limited to, a television, a projector and/or projector screen, a computer monitor, and the like. In another embodiment, at least one display module 702 may comprise a software aspect, such as, but not limited to, a display computer program or software, such as, but not limited to, a media player, display drivers, and the like. In yet another embodiment, at least one display module 702 may comprise both a hardware aspect and a software aspect.

In yet another embodiment, at least one input module 704 may comprise a hardware aspect, such as input hardware and/or a device, which may include, but is not limited to, a mouse, a keyboard, buttons, a touch screen, or a gesture control system. In another embodiment, at least one input module 704 may comprise a software aspect, such as, but not limited to, input software or an input computer program, which may include, but is not limited to, a user interface, a gesture user interface, input software, keystroke or input interpretation software, and the like. In yet another embodiment, at least one input module 704 may comprise both a hardware aspect and a software aspect.

In some embodiments, at least one piece of content may be any type of content, such as, but not limited to, sports content, movie content, live content, music content, arts content, news content, television content, game content, and the like.

In other embodiments, the information about at least one physical movement of at least one object in the at least one piece of content may be any type of information, such as, but not limited to, the timing of the physical movement, the type of physical movement, the effectiveness of the physical movement, the result of the physical movement, the path of the physical movement, and the like.

In some embodiments, the at least one object may be an animate object, such as, but not limited to, a person (as shown in FIG. 3) or an animal. In an alternate embodiment, the at least one object may be an inanimate object, such as a game controller, or a user instrument, such as, but not limited to, musical instruments, tools, household objects, and sports equipment, such as, but not limited to, a stick, a baseball bat, a ball, a racket, a club, a paddle, a ring, and the like. In a further embodiment, the at least one object may comprise both animate and inanimate objects, such as, but not limited to, a person holding an instrument, such as a piece of sports equipment (as shown in FIG. 7B).

Accordingly, in various embodiments, at least one first physical movement of the at least one object may be any type of movement, including but not limited to, a dance movement, sports movement, such as, but not limited to, a throwing movement, a swinging movement, a jumping movement, a running movement, a diving movement, a flying movement, a shooting movement, a driving movement, a dancing movement, and the like, or any arbitrary movement.

In a further embodiment, system 700 may comprise at least one communications module to transmit or receive information. The information may include the information that is being received via the input module. In one embodiment, the at least one communications module may comprise a hardware aspect, such as but not limited to, wireless communications hardware, such as, but not limited to, a wireless modem, a GSM modem, a Wi-Fi modem, an antenna, a satellite modem, a Bluetooth modem, and the like, or wired hardware, such as a DSL modem, a cable modem, a network card, a telephone modem, and the like. In yet another embodiment, the at least one communications module may comprise a software aspect, such as, but not limited to, a computer program or software, such as, but not limited to, a communications program, communications protocol, and the like. In yet another embodiment, the at least one communications module may comprise both a hardware aspect and a software aspect.

Referring now to FIG. 7B, one embodiment of system 700 is shown wherein at least one display module 702 comprises at least one display device and/or display software, at least one input module 704 comprises at least one user interface hardware and/or software, such as a keyboard, at least one piece of content 706 comprises sport content, and at least one physical object 708 comprises a person and/or piece of sports equipment.

In one embodiment, system 700 may comprise of at least one set of or a plurality of display modules 702 and input modules 704, wherein said modules may be located at a central monitoring station, such as at a television station or studio, or office building.

Overview of Method Embodiments

Figure 8:
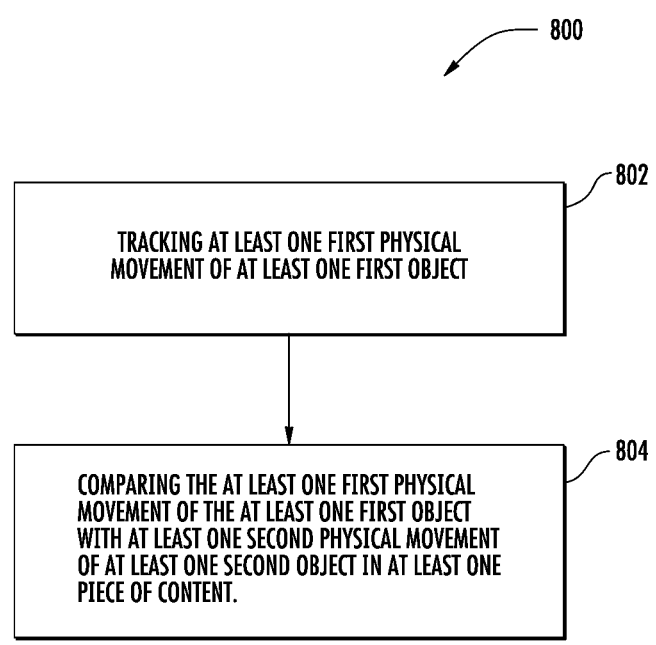
FIG. 8 shows a block diagram depicting a method in accordance with one embodiment.

Referring now to FIG. 8, a method 800 is shown, wherein method 800 comprises using at least one processor to perform at least one of the following: tracking at least one first movement of at least one first object (block 802), and comparing the at least one first physical movement of the at least one first object with at least one second physical movement of at least one second object in at least one piece of content (block 804).

In one embodiment, the at least one processor may be any type of processor, such as those processors and processor modules described above with reference to FIGS. 1A through 7B.

In another embodiment, tracking at least one first movement of at least one first object may include using at least one sensor to track the at least one first movement of at least one first object. The at least one sensor may be any type of sensor, such as a 3D sensor, and those other embodiments of sensors described above with reference to FIGS. 1A through 7B.

In yet another embodiment, the at least one first physical movement and/or the at least one second physical movement may be any type of movement, such as those various physical movements described above with reference to FIGS. 1A through 7B.

In yet a further embodiment, at least one first object and/or at least one second object may be any type of object, such as those various embodiments of objects described above with reference to FIGS. 1A through 7B.

In yet a further embodiment, at least one piece of content may be any type of content, such as those various embodiments of content described above with reference to FIGS. 1A through 7B.

In yet a further embodiment, method 800 comprises using at least one processor to determine whether the at least one first physical movement of the at least one first object and the at least one second physical movement of the at least one second object coincide. In some embodiments, determining whether the two physical movements coincide may comprise may include using object and/or image recognition software (such as those described above with reference to FIGS. 1A through 7B) to analyze and/or extract the physical movements from an image captured using a sensor, such as those sensors described above with reference to FIGS. 1A through 7B.

In yet another embodiment, method 800 may further comprise using at least one processor to conduct a game based on whether the at least one first physical movement of the at least one first object and the at least one second physical movement of the at least one second physical object coincide. In some embodiments, conducting a game may comprise allotting points based on how well the two physical movements coincide.

Figure 9:
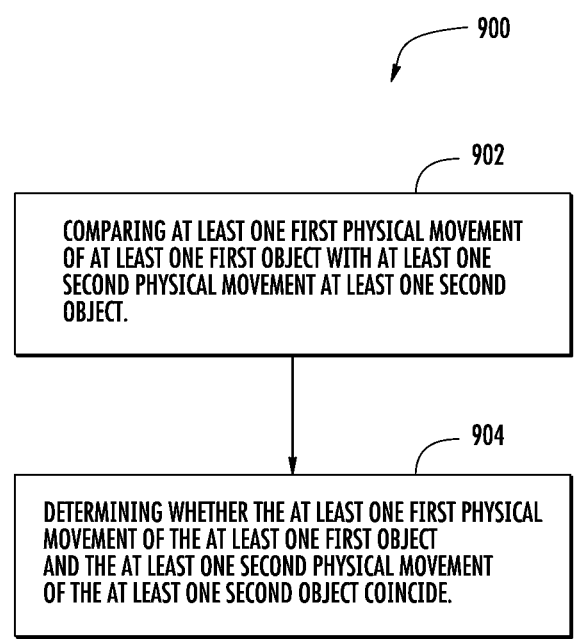
FIG. 9 shows a block diagram depicting a method in accordance with another embodiment.

Referring now to FIG. 9, one embodiment of method 900 is shown, wherein method 900 comprises using at least one processor to perform at least one of the following: comparing at least one first physical movement of at least one first object with at least one second physical movement of at least one second object (block 902), and determining whether the at least one first physical movement of the at least one first object and the at least one second physical movement of the at least one second object coincide (block 904).

In some embodiments, the at least one processor may be any type of processor and/or processing software, such as, but not limited to, those embodiments described above with reference to FIGS. 1A through 8.

In other embodiments, the at least one first physical movement and the at least one second physical movement may be any type of movement, such as, but not limited to, those types of physical movement described above with reference to FIGS. 1A through 8.

In yet other embodiments, at least one first object and at least one second object may be any type of objects, such as those described above with reference to FIGS. 1A through 8.

In one embodiment, method 900 may comprise using at least one processor to transmit or receive information about at least one of the at least one first physical movement of the at least one first object and the at least one second physical movement of the at least one second object.

In other embodiments, the information about at least one physical movement of at least one object in the at least one piece of content may be any type of information, such as, but not limited to, the timing of the physical movement, the type of physical movement, the effectiveness of the physical movement, the result of the physical movement, the path of the physical movement, and the like.

In a further embodiment, using at least one processor to transmit or receive information may comprise using at least one communications means to transmit or receive information, wherein the communications means may comprise a wired communications means, such as a land line modem, cable modem, DSL modem, and the like, or a wireless communications means, such as a wireless modem, a GSM modem, a satellite modem, and Wi-Fi adapter, and the like.

In another embodiment, method 900 may comprise using at least one processor to analyze at least one piece of content to determine information about at least one of the at least one first physical movement of the at least one first object and the at least one second physical movement of the at least one second object. In one embodiment, using at least one processor to analyze at least one piece of content may comprise using image and/or object recognition software to analyze the at least one piece of content, such as those types of image and/or object recognition software described above with reference to FIGS. 1A through 8. In some embodiments, the at least one piece of content may be any type of content, such as those described above with reference to FIGS. 1A through 8.

In a further embodiment, which may also be applied to the various embodiments of objects described throughout the present disclosure, at least one of the at least one first object and the at least one second object may be a subject of at least one piece of content. In another embodiment, which may also be applied to the various embodiments of objects described throughout the present disclosure, at least one of the at least one first object and the at least one second object may be a spectator of at least one piece of content.

Overview of Computer Readable Medium Embodiments

Another embodiment may comprise a computer readable medium having computer executable instructions operative to use at least one sensor to sense at least one first physical movement of at least one first object, and compare the at least one first physical movement of at least one first object with at least one second physical movement of at least one second object in at least one piece of content.

The computer readable medium may be any type of computer readable medium, such as, but not limited to, a memory chip, a hard drive, a CD-ROM, a DVD-ROM, a CD-RW, a USB memory stick, flash memory, random access memory, and the like.

Another embodiment may comprise a computer readable medium having computer executable instructions operative to perform any of the operations previously described with reference to FIGS. 1A through 9.

Overview of Hardware and Operating Environment

This section provides an overview of example hardware and the operating environments in conjunction with which embodiments of the inventive subject matter can be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 10 below.

Figure 10:
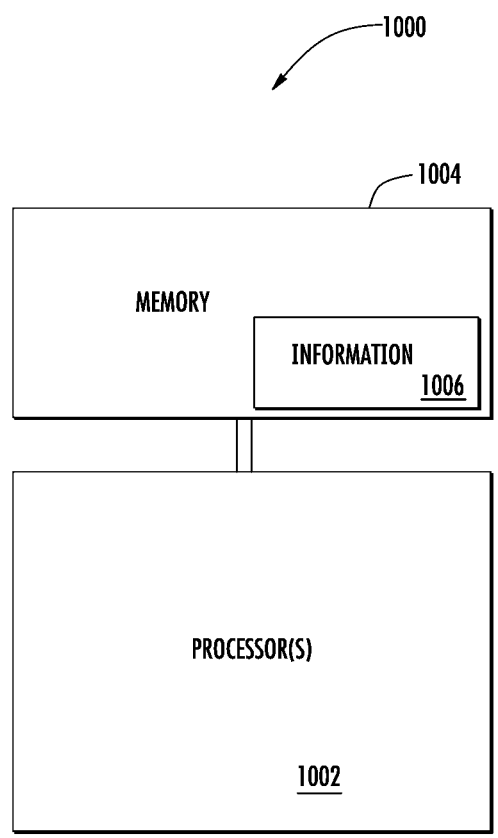
FIG. 10 shows a block diagram depicting an article in accordance with one embodiment.

FIG. 10 is a block diagram representing an article according to various embodiments. Such embodiments may comprise a computer, a memory system, a magnetic or optical disk, some other storage device, or any type of electronic device or system. The article 1000 may include one or more processor(s) 1002 coupled to a machine-accessible medium such as a memory 1004 (e.g., a memory including electrical, optical, or electromagnetic elements). The medium may contain associated information 1006 (e.g., computer program instructions, data, or both) which, when accessed, results in a machine (e.g., the processor(s) 1002) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   i) at least one processor; and
   ii) computer executable instructions readable by the at least one processor and operative to:
   a) use a display device to display at least one live televised sporting event to at least one television audience member of the at least one live televised sporting event, wherein the at least one live televised sporting event is a television broadcast of at least one live sporting event occurring in a first physical location, and wherein the at least one television audience member is a person located at a second physical location, different and remote from the first physical location, and observing the television broadcast of the at least one live sporting event;

b) use at least one first 3D camera to track at least one first physical movement of at least one first object or person participating in the at least one live sporting event, wherein the at least one first 3D camera is physically positioned in the first physical location;

c) use at least one second 3D camera to track at least one second physical movement of the at least one television audience member or at least one second object used by the at least one television audience member, while the at least one television audience member is attempting to mimic the at least one first physical movement, wherein the at least one second 3D camera is physically positioned in the second physical location;

d) compare the at least one first physical movement with at least one second physical movement of the at least one television audience member of the at least one live televised sporting event or the at least one object used by the at least one television audience member; and e) based on the comparing, determine, in a video game scenario, if the tracked second physical movement of the at least one television audience member or the at least one object used by the at least one television audience member mimics the tracked at least one first physical movement of the at least one first object or person participating in the at least one live televised sporting event.

2. The system of claim 1, wherein the computer executable instructions are further operative to: transmit or receive information to or from at least one central or remote station.

3. The system of claim 2, wherein the information comprises:
i) information related to the at least one live televised sporting event;
ii) information related to the at least one first physical movement or the at least one second physical movement;
iii) information related to the video game based on the at least one first physical movement or the at least one second physical movement;
iv) information related to the at least one television audience member or object used by the at least one television audience member; or
v) information related to the at least one first object or person participating in the at least one live televised sporting event.

4. The system of claim 1, wherein the video game is conducted during the television broadcast of the at least one live sporting event.

5. The system of claim 1, wherein, the computer executable instructions are further operative to determine a score based on whether the at least one television audience member or the at least one object used by the at least one television audience member mimics the at least one first physical movement of the at least one first object or person participating in the at least one live televised sporting event.

6. A system comprising:
i) at least one first 3D camera module camera physically positioned in a first physical location to track at least one first physical movement of at least one audience member of at least one piece of televised content, or at least one object used by the at least one audience member located at the first physical location observing the at least one piece of televised content, wherein the first physical location is different and remote from a second physical location where the at least one piece of televised content is broadcasted, wherein the tracking occurs while the at least one audience member is attempting to mimic at least one second physical movement of at least one participant or subject of the at least one piece of televised content or at least one object used by the at least one participant or subject, and wherein the at least one second physical movement is tracked using at least one second 3D camera physically positioned at the second physical location; and ii) at least one processor module to:
a) compare the at least one first physical movement with at least one second physical movement of at least one object or person participating in the at least one piece of televised content; and
b) based on the comparing, determine, in a video game scenario, if the tracked first physical movement of the at least one audience member or the at least one object used by the at least one audience member mimics the at least one second physical movement of the at least one object or person participating in the at least one piece of televised content.

7. The system of claim 6, wherein, the video game is conducted during the broadcast of the at least one piece of televised content.

8. The system of claim 6, further comprising at least one display module to display the at least one piece of televised content to the at least one audience member.

9. The system of claim 6, further comprising at least one communications module to transmit or receive information to or from a central station or remote station.

10. A method comprising:
a) using at least one processor configured to perform:
i) using at least one first 3D camera physically positioned in a first physical location to track at least one first physical movement of at least one television content audience member of at least one televised content, or at least one object used by the at least one television content audience member located at the first physical location observing the at least one televised content, wherein the first physical location is different and remote from a second physical location where the at least one televised content is broadcasted, wherein the tracking occurs while the at least one television content audience member is attempting to mimic at least one second physical movement of at least one participant or subject of the at least one televised content or at least one object used by the at least one participant or subject, and wherein the at least one second physical movement is tracked using at least one second 3D camera physically positioned at the second physical location;
ii) comparing the at least one first physical movement of the at least one television content audience member of the at least one televised content, or the at least one object used by the at least one television content audience member with the at least one second physical movement of at least one participant or subject of the at least one televised content or at least one object used by the at least one participant or subject;
iii) based on the comparing, determining, in a video game scenario, whether the tracked first physical movement of the at least one television content audience member mimics the tracked at least one second physical movement of the at least one participant or subject of the at least one televised content or at least one object used by the at least one participant or subject.

11. The method of claim 10, wherein the at least one processor is further configured to transmit or receive information about at least one of the at least one first physical movement or the at least one second physical movement.

12. The method of claim 10, wherein the at least one processor is further configured to analyze the at least one televised content, or a recording of the at least one televised content, to determine information about at least one of the at least one first physical movement or the at least one second physical movement.

13. The method of claim 10, wherein the at least one televised content comprises at least one live televised sporting event.

14. The method of claim 10, wherein the at least one participant or subject of the at least one televised content or the at least one object used by the at least one participant or subject comprises at least one player or at least one piece of sports equipment used by the at least one player.

\* \* \* \* \*